(12) United States Patent
Lai

(10) Patent No.: US 6,259,057 B1
(45) Date of Patent: Jul. 10, 2001

(54) AUTOMATICALLY FOCUSING STRUCTURE OF LASER SCULPTURING MACHINE

(75) Inventor: Jin-Sheng Lai, Taipei (TW)

(73) Assignee: Great Computer Corp., Taipei Hsien (TW)

( * ) Notice: Subject to any disclaimer, the term of this patent is extended or adjusted under 35 U.S.C. 154(b) by 0 days.

(21) Appl. No.: 09/309,916

(22) Filed: May 11, 1999

(51) Int. Cl.$^7$ .............................. B23K 26/08; B23K 26/02
(52) U.S. Cl. ............................. 219/121.73; 219/121.67; 219/121.68
(58) Field of Search .................... 219/121.83, 121.67, 219/121.68, 121.72, 121.78, 121.73, 121.62, 121.61

(56) References Cited

U.S. PATENT DOCUMENTS

| | | | |
|---|---|---|---|
| 3,583,561 | * | 6/1971 | Wiesler . |
| 3,617,683 | * | 11/1971 | Beresford et al. . |
| 4,074,104 | * | 2/1978 | Fulkerson . |
| 5,061,839 | * | 10/1991 | Matsuno et al. . |
| 5,304,773 | * | 4/1994 | Kilian et al. . |

FOREIGN PATENT DOCUMENTS 63-220990 * 9/1988 (JP) .
2160191 * 6/1990 (JP) .

* cited by examiner

Primary Examiner—Tom Dunn
Assistant Examiner—Jonathan Johnson
(74) Attorney, Agent, or Firm—Varndell & Varndell, PLLC

(57) ABSTRACT

An automatically focusing structure of laser sculpturing machine, including an electronic probe structure vertically mounted on a blade seat of the laser sculpturing machine. The electronic probe structure includes a circular tube with a certain length. The top section of the probe structure is formed with a flange. An upper and a lower sections of the circular tube are respectively formed with two annular grooves for locating a locating rod of the blade seat. The circular centers of the upper and lower end faces of the circular tube are respectively disposed with openings for a first and a second inner electronic detection bars to outward extend therethrough. An electric working bench is lifted in Z axis direction to make the surface of a work piece contact with the probe. The focus of a lens memorized by a software is calculated and then the working bench is accordingly lowered to the focus face to complete the automatically focusing operation. During working, the electronic probe structure is upward restored so as not to touch the work piece.

3 Claims, 6 Drawing Sheets

AUTOMATICALLY FOCUSING STRUCTURE OF LASER SCULPTURING MACHINE

BACKGROUND OF THE INVENTION

The present invention relates to an automatically focusing structure of laser sculpturing machine, and more particularly to an electronic probe structure capable of automatically detecting the focus and applicable to a laser processing machine and the like.

The basic principle of a laser processing machine is such that an output laser beam is guided and focused onto the surface of a work piece. The focused light beam is absorbed by the material which is vaporized due to suddenly increasing temperature. Accordingly, the surface of the work piece is depressed so as to achieve a sculpturing and cutting object.

The focusing operation of a conventional laser processing machine is manually performed. The laser beam is guided by a reflecting mirror through a focusing lens to be focused at the focus of the lens. In order to position the work piece at the focuses of all different specifications of lenses, specific focusing bars with different lengths in cooperation with the specifications of the lenses are used. The focusing bar is placed in a left circular hole of the blade and a hand wheel on upper side of the machine is operated to drive three thread rods so as to lift or lower the entire processing platform and make the work piece thereon slightly contact with the focusing bar. At this time, the surface of the work piece is positioned on the focusing face of the laser beam so as to achieve the object of focusing.

There is another type of laser processing machine which employs automatically focusing measure. The left lower and right lower sides of the X, Y axes plane of the machine are respectively disposed with a transmitting sensor and a corresponding receiving sensor. After the platform is lifted and the sensors detect the work piece, the platform is then lowered to the focusing face to complete the automatically focusing operation. However, such focusing measure has many shortcomings as follows:

1. It cannot detect a bowl-shaped or irregular work piece.
2. The work piece must be fixed at a position on upper side.
3. A transparent work piece will lead to error of detection.
4. After a rotary shaft is mounted, the automatically focusing function will be lost.

SUMMARY OF THE INVENTION

It is therefore a primary object of the present invention to provide an automatically focusing structure of laser sculpturing machine, in which the work piece processing section is directly detected so that the error of focusing caused by unplanarity of the work piece is reduced.

It is a further object of the present invention to provide the above automatically focusing structure which is able to accurately focus a work piece with any material and profile ( such as irregular curve face or transparent material ).

It is still a further object of the present invention to provide the above automatically focusing structure which is able to successfully perform the detection even after the rotary shaft is mounted.

According to the above objects, the automatically focusing structure of laser sculpturing machine of the present invention includes an electronic probe structure vertically mounted on a blade seat of the laser sculpturing machine. The electronic probe structure includes a circular tube with a certain length. The top section of the probe structure is formed with a flange. An upper and a lower sections of the circular tube are respectively formed with two annular grooves for locating a locating rod of the blade seat. The circular centers of the upper and lower end faces of the circular tube are respectively disposed with openings for a first and a second inner electronic detection bars to outward extend therethrough. An electric working bench is lifted in Z axis direction to make the surface of a work piece contact with the probe. The focus of a lens memorized by a software is calculated and then the working bench is accordingly lowered to the focus face to complete the automatically focusing operation. During working,, the electronic probe structure is upward restored so as not to touch the work piece.

The present invention can be best understood through the following description and accompanying drawings wherein:

DETAILED DESCRIPTION OF THE PREFERRED EMBODIMENT

Figure 1:
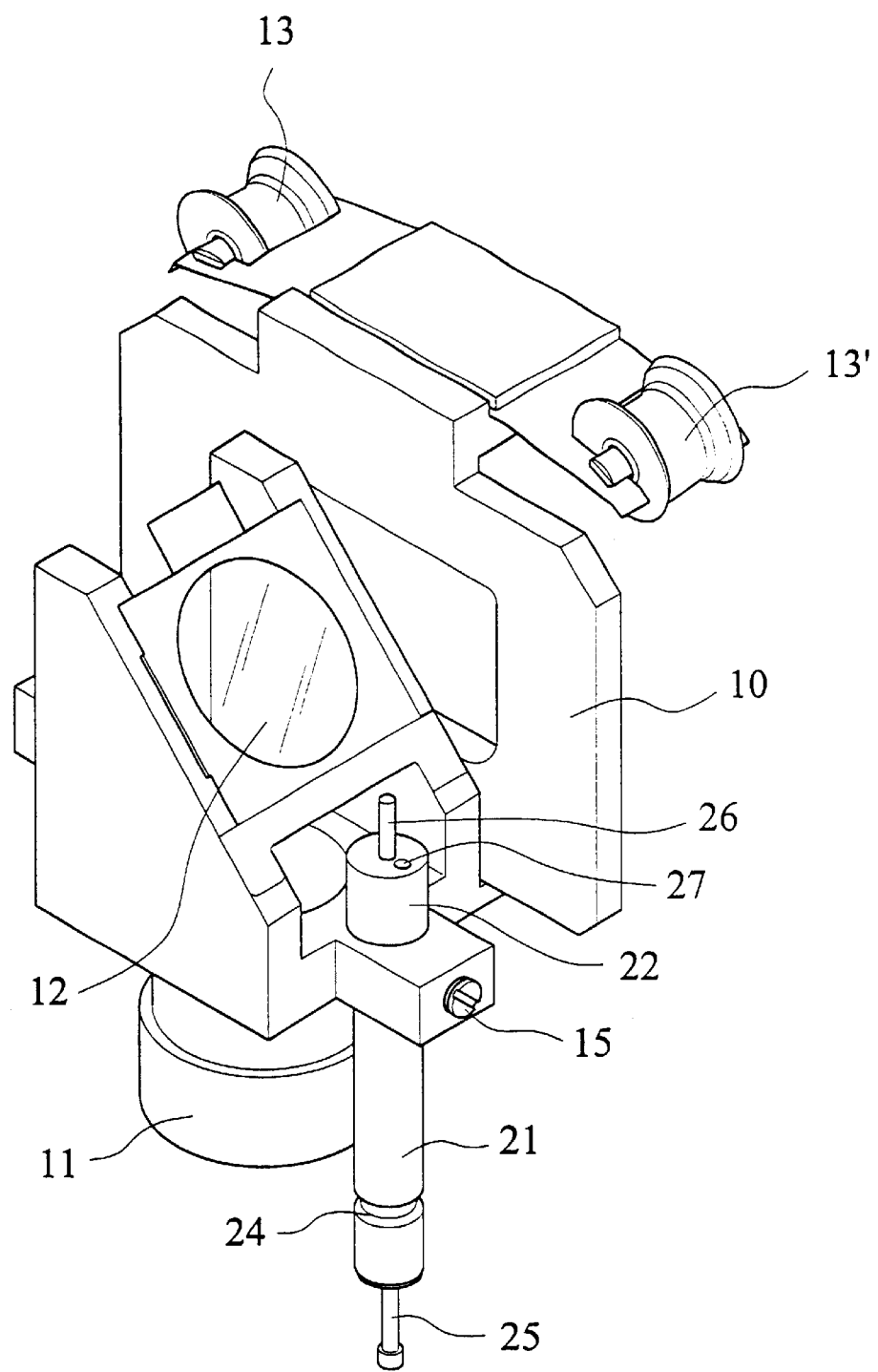
FIG. 1 is a perspective assembled view of the present invention.

Please refer to FIG. 1. According to the present invention, an electronic probe structure 20 is vertically mounted on a conventional blade seat 10 in parallel to the lens 11.

Figure 2:
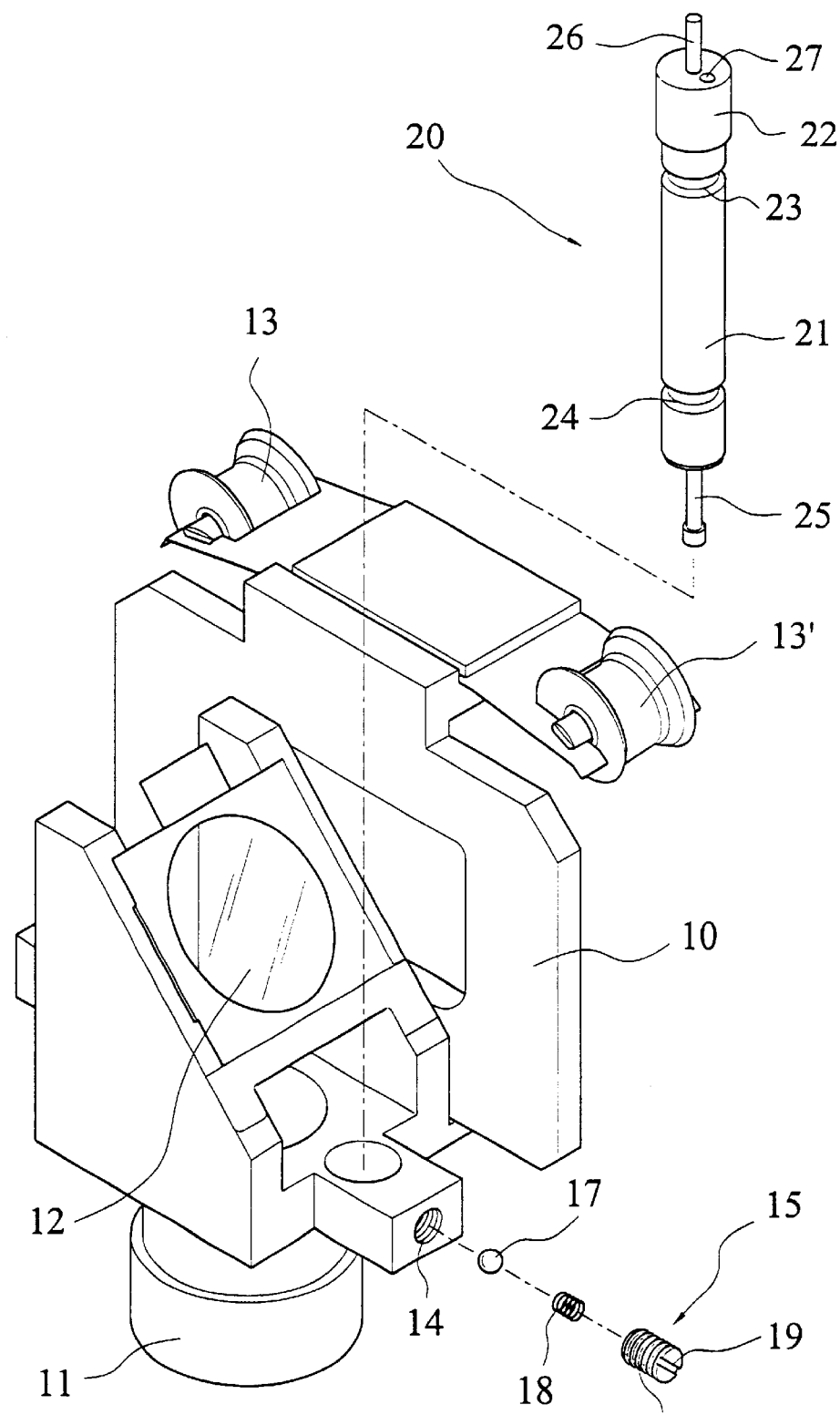
FIG. 2 is a perspective explode view of the present invention.

Referring to FIGS. 1 and 2, the probe structure 20 includes a certain length of circular tube 21 a top end of which is formed with a flange 22. An upper and a lower sections of the circular tube 21 are respectively formed with two annular grooves 23, 24. The circular centers of the upper and lower end faces of the circular tube 21 are respectively disposed with openings 28 for a first and a second inner detection bars 25, 26 to outward extend therethrough. In addition, the top end face of the circular tube 21 is formed with a wire hole 27 near the circular center. A wire 31 connected with the top section of the first detection bar 25 is conducted outward through the wire hole 27.

Figure 3:
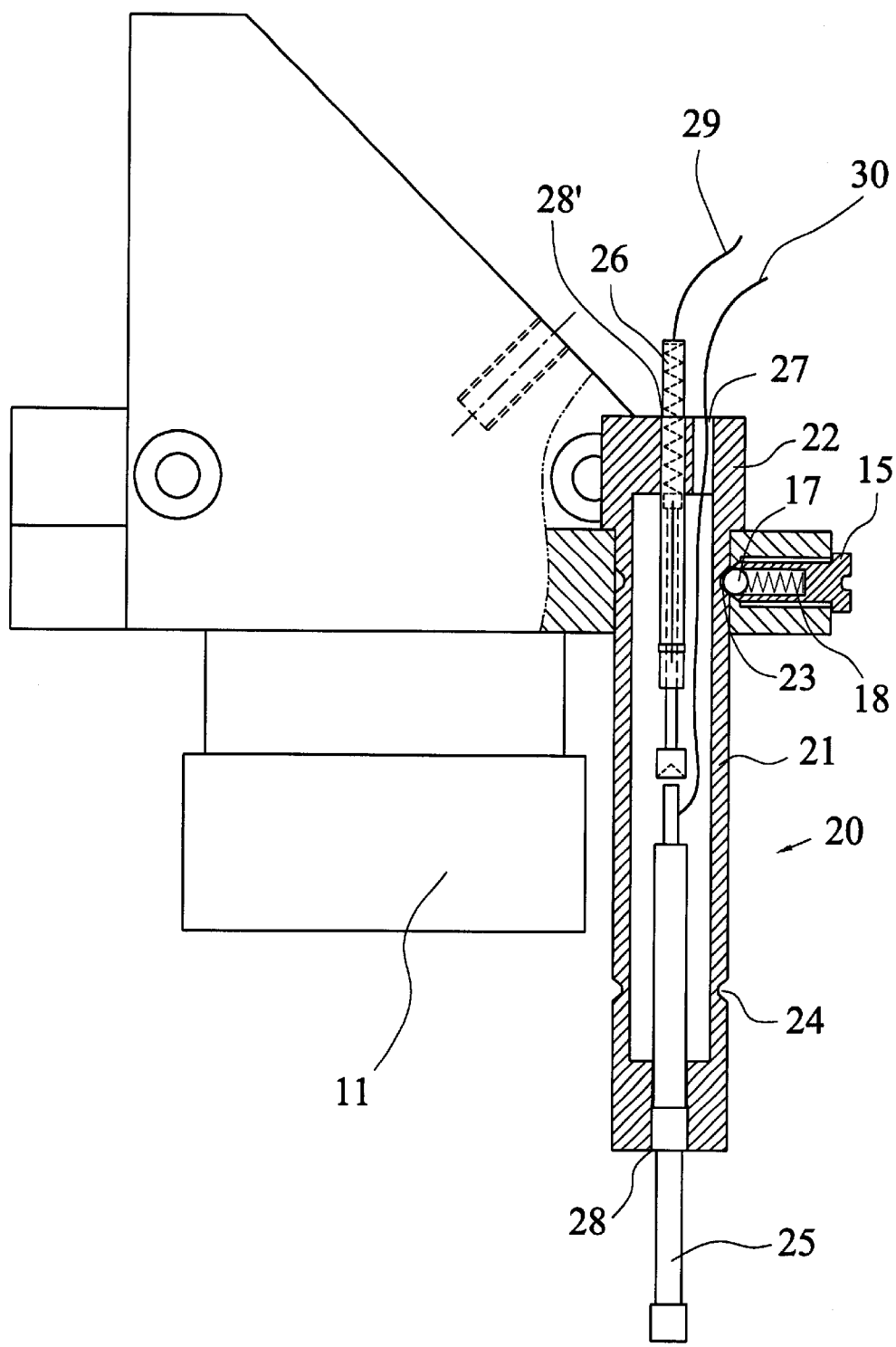
FIG. 3 is a sectional assembled view of the present invention in one state.
Figure 4:
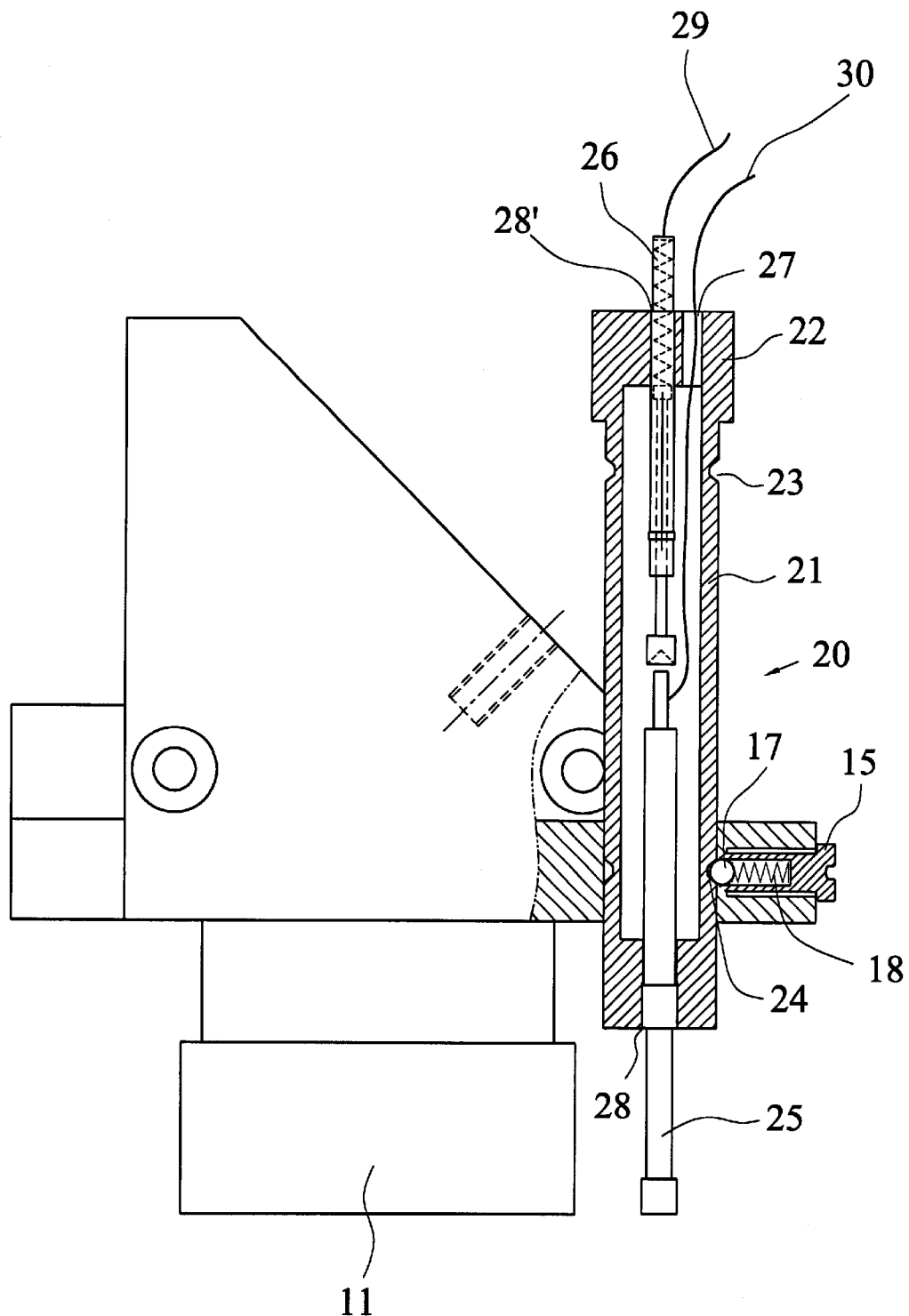
FIG. 4 is a sectional assembled view of the present invention in another state.

The blade seat 10 is formed with a circular hole in which the probe structure 20 is placed. A locating hole 14 is parallelly formed on the blade seat 10 and communicated with the circular hole. A locating rod 15 formed with outer thread 16 is screwed into the locating hole 14. A rear end of the locating rod 15 is formed with a notch 19 for a tool to screw the locating rod 15 into the locating hole 14. A spring 18 is installed in the locating rod 15. A steel ball 17 is disposed at front end of the spring 18 to engage with a front end of the locating rod 15. The probe structure 20 is vertically placed into the circular hole of the platform beside the lens 11 of the blade seat 10. Under such circumstance, the steel ball 17 at front end of the locating rod 15 is pressed and retracted by the circular tube of the probe structure 20, permitting the probe structure 20 to be continuously pressed downward until the flange 22 of the top section of the circular tube 21 abuts against the platform. At this time, the steel ball 17 of the locating rod 15 is engaged in the upper annular groove 23 of the circular tube 21 ( as shown in FIG. 3 ) so as to locate and install the probe structure on the blade seat 10.

Figure 5:
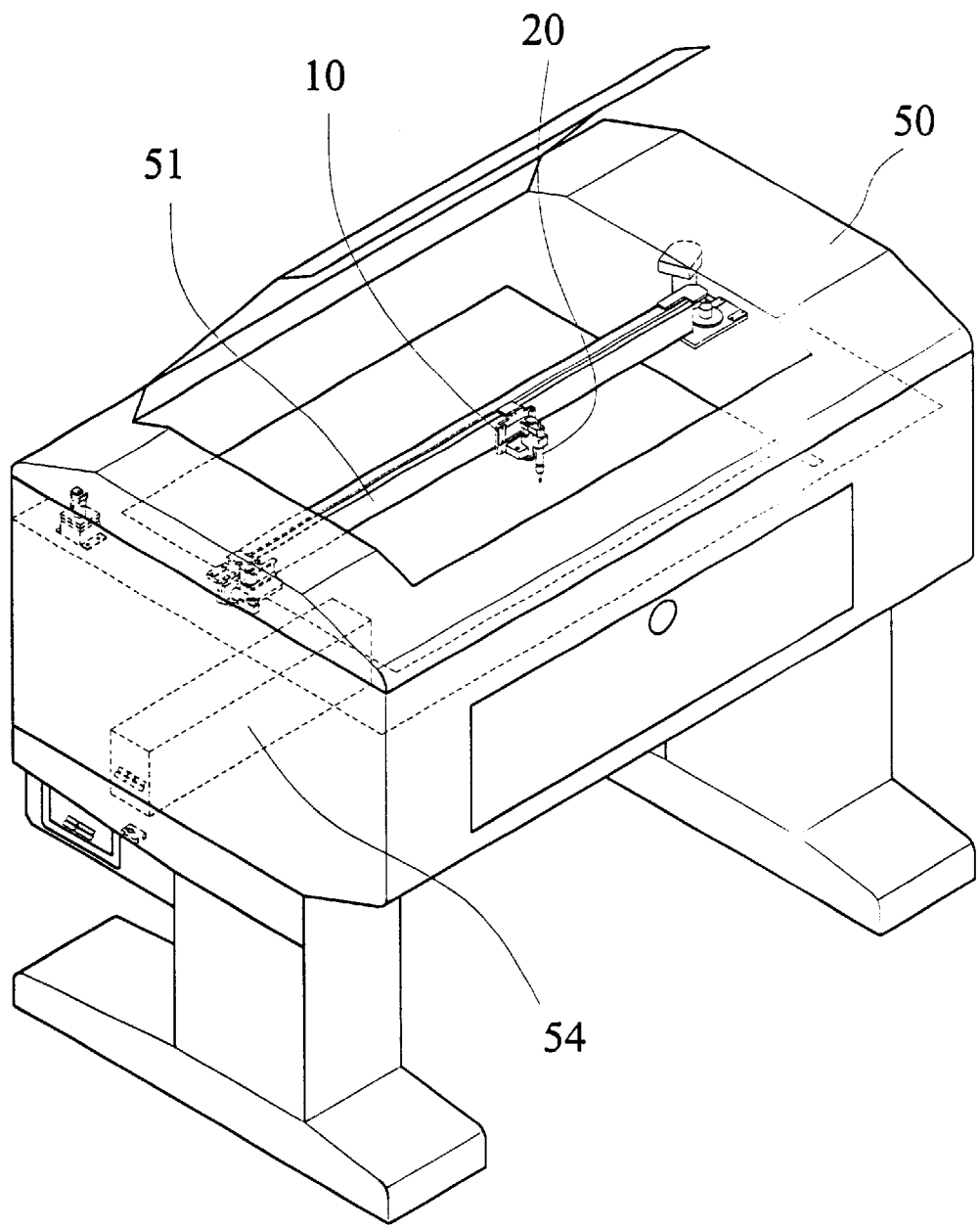
FIG. 5 shows that the present invention is applied to the laser sculpturing machine.

Referring to FIG. 5, the above blade seat 10 is then mounted on the working axis 51 ( X axis ) of the laser sculpturing machine 50. By means of rollers 13, 13', the blade seat 10 is reciprocally slided left and right on the working axis 51. The working axis 51 can be also slided back and forth by means of the slide rails 52 ( Y axis ) at two ends thereof Therefore, the blade seat 10 can be freely moved to a desired position. In addition, in cooperation with the vertically movable working bench 53 ( Z axis ), a three-dimensional measurement can be achieved for a work piece with smooth and curved profile.

Figure 6:
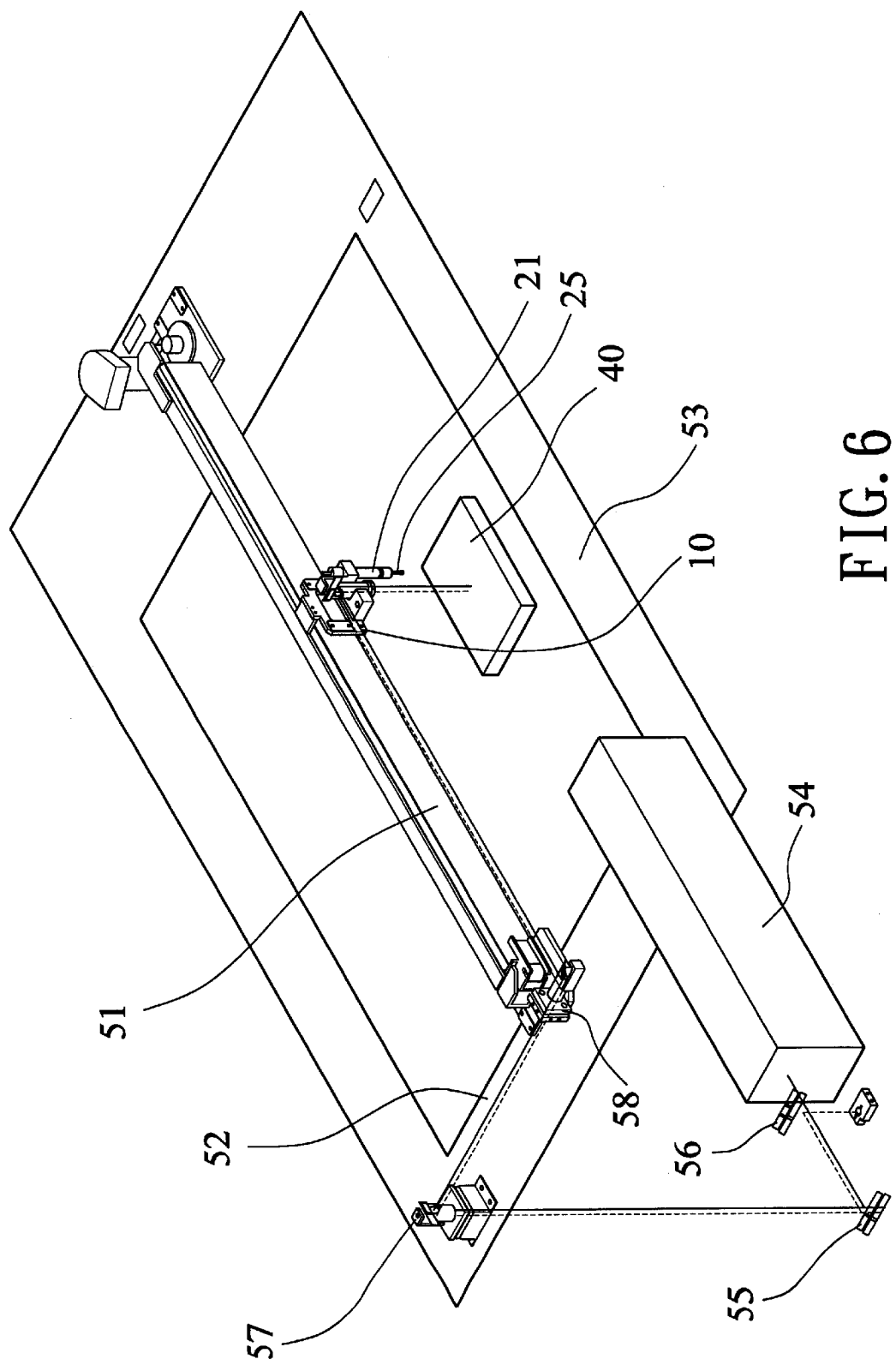
FIG. 6 shows the path of the laser beam of the laser sculpturing machine.

Please refer to FIG. 6. A work piece 40 is placed on the working bench 53 which is lifted to make the surface of the work piece 40 contact with the first detection bar 25. The focus of the lens memorized by the software is calculated and then the working bench 53 is accordingly lowered to the focus face. At this time, the entire probe structure 20 can be upward pulled, making the steel ball 17 of the locating rod 15 engaged in the lower annular groove 24 of the circular tube 21. Under such circumstance, the probe structure 20 is stored on upper edge of the lens 11 so as to prevent the probe structure 20 from touching or moving the work piece 40 when the machine 50 works and moves.

Referring to FIG. 6, the light beam emitted by the laser tube 54 of the machine is reflected by a reflecting mirror 55 to a reflecting mirror 57 beside the slide rail and then refracted to the reflecting mirror 58 at one end of the working axis 51. Finally, the light beam is guided by the reflecting mirror 12 on the blade seat 10 onto the focus face of the work piece 40. At this time, the surface of the work piece 40 is vaporized due to suddenly increasing temperature so as to achieve the objects of sculpturing and cutting.

The above automatically detecting and focusing measure of the present invention has the following advantages:

1. The processing position of the work piece is not limited.
2. The work piece processing section is directly detected so that the error of focusing caused by unplanarity of the work piece is reduced.
3. The irregular profile of the work piece will not lead to misfocusing.
4. The difficult in detection of curve face and the problem that it is impossible to perform the detection after installing the rotary shaft are overcome.
5. The transparency of the work piece will not lead to misdetection.

The above embodiment is only used to illustrate the present invention, not intended to limit the scope thereof. Many modifications of the above embodiment can be made without departing from the spirit of the present invention.

What is claimed is:

1. An automatically focusing structure of laser sculpturing machine, comprising an electronic probe structure vertically mounted on a blade seat of the laser sculpturing machine, the electronic probe structure including a circular tube having a top end formed with a flange, upper and a lower sections of the circular tube respectively having two annular grooves for locating a locating rod of the blade seat, a circular center of a lower end face of the circular tube having an opening holding a first electronic detection bar outwardly extending therethrough, and a circular center of an upper end face of the circular tube having an opening holding a second electronic detection bar outwardly extending therethrough.

2. An automatically focusing structure of laser sculpturing machine as claimed in claim 1, wherein the locating rod is a hollow thread rod in which a spring is installed, a steel ball being disposed at front end of the spring to engage with a front end of the locating rod.

3. An automatically focusing structure of laser sculpturing machine as claimed in claim 2, wherein the locating rod is transversely screwed into a locating hole of the blade seat and perpendicular to the electronic probe structure.

\* \* \* \* \*